(12) United States Patent
Ko et al.

(10) Patent No.: US 7,267,025 B2
(45) Date of Patent: Sep. 11, 2007

(54) TILT ADJUSTING UNIT FOR STEERING COLUMNS

(75) Inventors: Min Young Ko, Wonju-Si (KR); Jong Hoon Shin, Gwangmyeong-Si (KR)

(73) Assignee: Mando Corporation, Pyungtak, Kyungki-Do (KR)

( * ) Notice: Subject to any disclaimer, the term of this patent is extended or adjusted under 35 U.S.C. 154(b) by 569 days.

(21) Appl. No.: 10/746,593

(22) Filed: Dec. 23, 2003

(65) Prior Publication Data

US 2004/0134302 A1   Jul. 15, 2004

(30) Foreign Application Priority Data

Jan. 6, 2003   (KR) .................. 10-2003-0000528
Jan. 6, 2003   (KR) .................. 10-2003-0000529
Jan. 6, 2003   (KR) .................. 10-2003-0000530

(51) Int. Cl.
 B62D 1/18   (2006.01)
(52) U.S. Cl. ....................................... 74/493
(58) Field of Classification Search ............ 74/493, 74/567, 569; 280/775; 403/110
See application file for complete search history.

(56) References Cited

U.S. PATENT DOCUMENTS 5,213,004 A * 5/1993 Hoblingre ................. 74/493
6,851,331 B2 * 2/2005 Kuroumaru et al. ......... 74/493
7,010,996 B2 * 3/2006 Schick et al. ............... 74/492
2002/0027355 A1 * 3/2002 Bohlen et al. .............. 280/775
2002/0175512 A1 * 11/2002 Irish et al. .................. 280/775
2003/0221505 A1 * 12/2003 Schick et al. ............... 74/493
2004/0035238 A1 * 2/2004 Jolley et al. ................ 74/493

FOREIGN PATENT DOCUMENTS

JP   2003-212133   7/2003
JP   2003212133 A * 7/2003

OTHER PUBLICATIONS

U.S. Appl. No. 10/746,594, filed Dec. 23, 2003, Ko et al.

* cited by examiner

Primary Examiner—Richard Ridley
Assistant Examiner—Terence Boes
(74) Attorney, Agent, or Firm—Ladas & Parry LLP

(57) ABSTRACT

A tilt adjusting unit for steering columns of vehicles. The tilt adjusting unit includes a support bracket having a guide slot and mounted to a vehicle body, a movable bracket to tilt along with the steering column, a connection rod to connect the movable bracket to the support bracket, a stopper provided at each of opposite ends of the connection rod. A locking unit is disposed on the connection rod to lock or unlock the movable bracket to or from the support bracket. The locking unit includes a rotary unit rotatably provided on a predetermined portion of the connection rod and a movable unit provided on the connection rod which moves axially along the connection rod as the rotary unit rotates, thus locking or unlocking the movable bracket to or from the support bracket. The movable unit is inhibited from rotating with the rotary unit by rotation preventing projections.

13 Claims, 10 Drawing Sheets

TILT ADJUSTING UNIT FOR STEERING COLUMNS

CROSS-REFERENCE TO RELATED APPLICATIONS

This application claims the benefit of Korean Application No. 2003-528, filed Jan. 6, 2003 and Korean Patent Application No. 2003-529 filed on Jan. 6, 2003 and Korean Patent Application No. 2003-530 filed on Jan. 6, 2003, in the Korean Intellectual Property Office, the disclosures of which are incorporated herein by reference.

BACKGROUND OF THE INVENTION

1. Field of the Invention

The present invention relates, in general, to a tilt adjusting unit for steering columns and, more particularly, to a tilt adjusting unit for steering columns, which allows a user to easily confirm whether a steering column is locked at a desired angle or not.

2. Description of the Related Art

Generally, a steering column for vehicles couples a steering wheel to axles of wheels, and functions to change a moving direction of a vehicle. As a user rotates the steering wheel in a direction, the steering column rotates in the same direction to control directions of the wheels, thus adjusting the moving direction of the vehicle.

Further, the steering column is constructed to be tiltable up and down, so that a position of the steering wheel is adjusted according to a user's size or preference, by adjusting an angle of the steering column. A hinge shaft is provided on a mid-part or a lower end of the steering column so that the steering column rotates around the hinge shaft. Further, a tilt adjusting unit is provided at a predetermined position around the steering column to guide a tilting motion of the steering column and lock the steering column at an adjusted angle.

As shown in FIG. 1, a conventional tilt adjusting unit for steering columns includes a mounting bracket 1, first and second support brackets 3, and a movable bracket 4. The mounting bracket 1 is mounted to a predetermined portion of a vehicle body. The first and second support brackets 3 are mounted to the mounting bracket 1 to be placed on left and right sides of a steering column 2. The movable bracket 4 is placed at a position between the first and second support brackets 3, and is secured to the steering column 2, through, for example, a welding process, to tilt along with the steering column 2.

First and second support parts 5 are provided on left and right edges of the movable bracket 4 to be supported by inner surfaces of the first and second support brackets 3, respectively. Each of the first and second support parts 5 has a through hole 5a, and a guide slot 3a is formed through each of the first and second support brackets 3 at a position corresponding to the through hole 5a. The first and second support brackets 3 and the movable bracket 4 are connected to each other, by an adjusting bolt 6 which passes through the through holes 5a of the first and second support parts 5 and the guide slots 3a of the first and second support brackets 3.

Such a construction makes the adjusting bolt 6 move up and down along the guide slots 3a when the movable bracket 4 is angled vertically, thus adjusting the angle of the steering column 2 which is secured to the movable bracket 4.

Further, the adjusting bolt 6 includes a head 6a and a shank 6b. The head 6a is provided at an end of the adjusting bolt 6 to be supported by an outer surface of one of the first and second support brackets 3. The shank 6b extends from the head 6a, and passes through the first and second support brackets 3 and the first and second support parts 5 to be outwardly projected from a remaining one of the first and second brackets 3. An external threaded part 6c is formed on an end of the shank 6b which passes through the first and second support brackets 3. An adjusting nut 7 having an internal threaded part 7a engages with the external threaded part 6c of the adjusting bolt 6. Further, an adjusting lever 8 is fastened to the adjusting nut 7 using a screw 9.

Thus, when the angle of the steering column 2 is adjusted along the guide slots 3a, and the adjusting lever 8 rotates to tighten the adjusting nut 7, the adjusting nut 7 presses the first and second support brackets 3. At this time, friction between the first and second support brackets 3 and the movable bracket 4 increases, thus locking the steering column 2 at a desired angle.

Meanwhile, when the user desires to re-adjust the angle of the steering column 2 in such a state, the adjusting lever 8 rotates in a reverse direction to loosen the adjusting nut 7. At this time, the friction between the first and second support brackets 3 and the movable bracket 4 reduces, thus allowing the angle of the steering column 2 to be adjusted again.

As such, the conventional tilt adjusting unit for steering columns is constructed to lock the steering column 2 using the adjusting nut 7. In this case, as the adjusting nut 7 is increasingly tightened, friction between the first and second support brackets 3 and the movable bracket 4 gradually increases. Thus, the conventional tilt adjusting unit has a problem in that it is difficult to determine an extent to tighten the adjusting nut 7 so as to reliably lock the steering column 2 at a desired angle.

SUMMARY OF THE INVENTION

Accordingly, it is an aspect of the present invention to provide a tilt adjusting unit for steering columns, which allows a user to easily confirm whether a steering column is locked at a desired angle or not.

Additional aspects and/or advantages of the invention will be set forth in part in the description which follows and, in part, will be obvious from the description, or may be learned by practice of the invention.

The above and/or other aspects are achieved by a tilt adjusting unit for steering columns, including a support bracket, a steering column, a movable bracket, a connection rod, a guide slot, a stopper, and a locking unit. The support bracket is mounted to a predetermined portion of a vehicle body. The steering column is mounted to a predetermined portion of the vehicle body to tilt relative to the vehicle body. The movable bracket tilts along with the steering column. The connection rod connects the movable bracket to the support bracket. The guide slot is formed on a predetermined portion of the support bracket along a tilting direction of the steering column, with the connection rod passing through the guide slot. The stopper is provided at each of opposite ends of the connection rod to prevent the movable bracket from being removed from the support bracket. The locking unit is provided on a predetermined portion of the connection rod to lock or unlock the movable bracket to or from the support bracket, and includes a rotary unit, a movable unit, and a rotation restraining part. The rotary unit is rotatably provided on a predetermined portion of the connection rod. The movable unit is provided on a predetermined portion of the connection rod so that the movable unit and the rotary unit support each other, and the movable unit moves along the connection rod as the rotary unit rotates, thus locking or unlocking the movable bracket to or from the support bracket. The rotation restraining part is provided on a predetermined portion of either the rotary unit or the movable unit to prevent the rotary unit from rotating when the movable bracket is locked to the support bracket.

A first cam face may be provided on one of facing surfaces of the rotary unit and the movable unit which face each other, and may have an inclined part which is inclined along a circumferential direction of the first cam face. A second cam face may be provided on a remaining one of the facing surfaces of the rotary unit and the movable unit which face each other, and may have a pressing part to press or release the inclined part according to a rotating direction of the rotary unit.

The rotation restraining part may be provided at an edge of the inclined part to stop the pressing part.

The inclined part may have a shape of a depression which is depressed on the first cam face, the pressing part may have a shape of a projection which is projected from the second cam face, and the rotation restraining part may be provided between the edge of the inclined part, which is adjacent to the second cam face, and the first cam face.

The inclined part may have a shape of a projection which is projected from the first cam face, the pressing part may be provided to receive the inclined part therein, and the rotation restraining part may extend from the edge of the inclined part, which is adjacent to the second cam face, into the pressing part.

The inclined part may comprise a plurality of inclined parts, and the pressing part may comprise a plurality of pressing parts corresponding to the plurality of inclined parts.

The movable unit and the connection rod may be provided so that the movable unit and the connection rod are prevented from rotating.

The movable unit may comprise a pair of movable units provided on opposite sides of the rotary unit. The pair of movable units may comprise an inner movable unit provided at a predetermined position inside the rotary unit, and an outer movable unit provided at a predetermined position outside the rotary unit.

The support bracket may include first and second support brackets which are provided on opposite sides of the steering column, respectively, with a first rotation preventing projection being provided at a predetermined portion of the inner movable unit to be supported by the first support bracket, and a second rotation preventing projection being provided at a predetermined portion of the stopper to be supported by the second support bracket, thus preventing the inner movable unit and the connection rod from rotating. The movable bracket may be provided at a predetermined position between the first and second support brackets. The stopper may include a first stopper which is provided at a predetermined position adjacent to the first support bracket, with a third rotation preventing projection being provided at a predetermined portion of the outer movable unit to be mounted to the first stopper, thus preventing the outer movable unit from rotating, and a second stopper which is provided at a predetermined position adjacent to the second support bracket, with the second rotation preventing projection being provided at a predetermined portion of the second stopper. The locking unit may be provided at a predetermined position between the first stopper and the first support bracket.

The first and second rotation preventing projections may be respectively fitted into the guide slots of the first and second support brackets, and the first stopper may have at a predetermined portion thereof a seat groove so that the third rotation preventing projection is seated in the seat groove.

The movable unit may be provided between the rotary unit and the support bracket.

The support bracket may include first and second support brackets which are provided on opposite sides of the steering column, respectively, with a first rotation preventing projection being provided at a predetermined portion of the inner movable unit to be supported by the first support bracket, and a second rotation preventing projection being provided at a predetermined portion of the stopper to be supported by the second support bracket, thus preventing the movable unit and the connection rod from rotating. The movable bracket may be provided at a predetermined position between the first and second support brackets. The stopper may include a first stopper which is provided at a predetermined position adjacent to the first support bracket, and a second stopper which is provided at a predetermined position adjacent to the second support bracket, with the second rotation preventing projection being provided at a predetermined portion of the second stopper. The locking unit may be provided at a predetermined position between the first stopper and the first support bracket.

The first and second rotation preventing projections may be respectively fitted into the guide slots of the first and second support brackets.

A bearing may be provided at a predetermined position between the rotary unit and the first stopper.

A lever may be provided on a predetermined portion of the rotary unit.

BRIEF DESCRIPTION OF THE DRAWINGS

These and other aspects and advantages of the invention will become apparent and more readily appreciated from the following description of the preferred embodiments, taken in conjunction with the accompanying drawings of which.

DETAILED DESCRIPTION OF THE PREFERRED EMBODIMENTS

Figure 1:
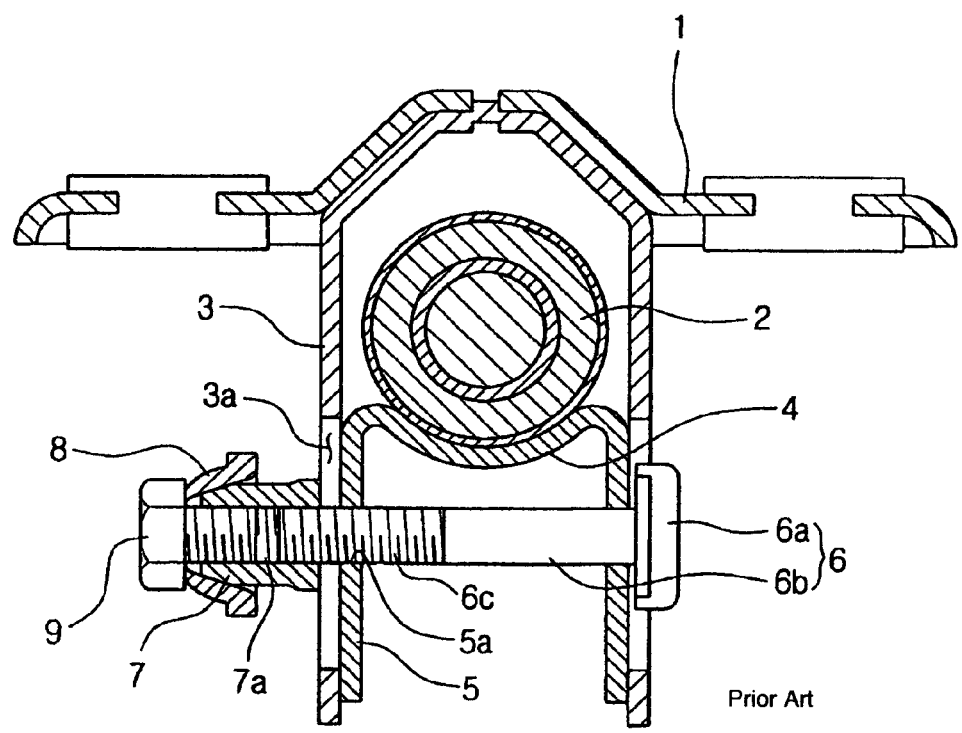
FIG. 1 is a sectional view of a conventional tilt adjusting unit for steering columns.

Reference will now be made in detail to the present preferred embodiments of the present invention, examples of which are illustrated in the accompanying drawings, wherein like reference numerals refer to like elements throughout. The embodiments are described below in order to explain the present invention by referring to the figures.

Figure 2:
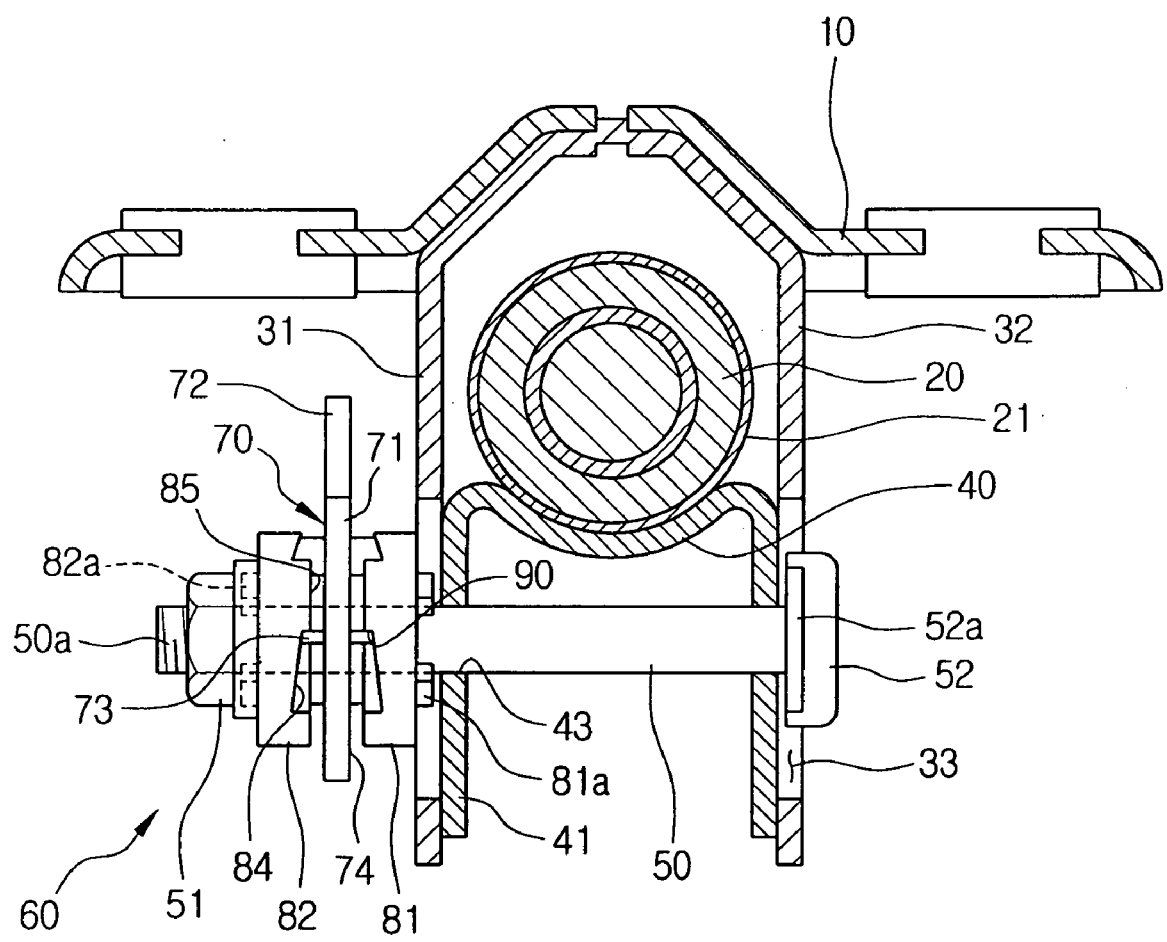
FIG. 2 is a sectional view of a tilt adjusting unit for steering columns, according to a first embodiment of the present invention.
Figure 3:
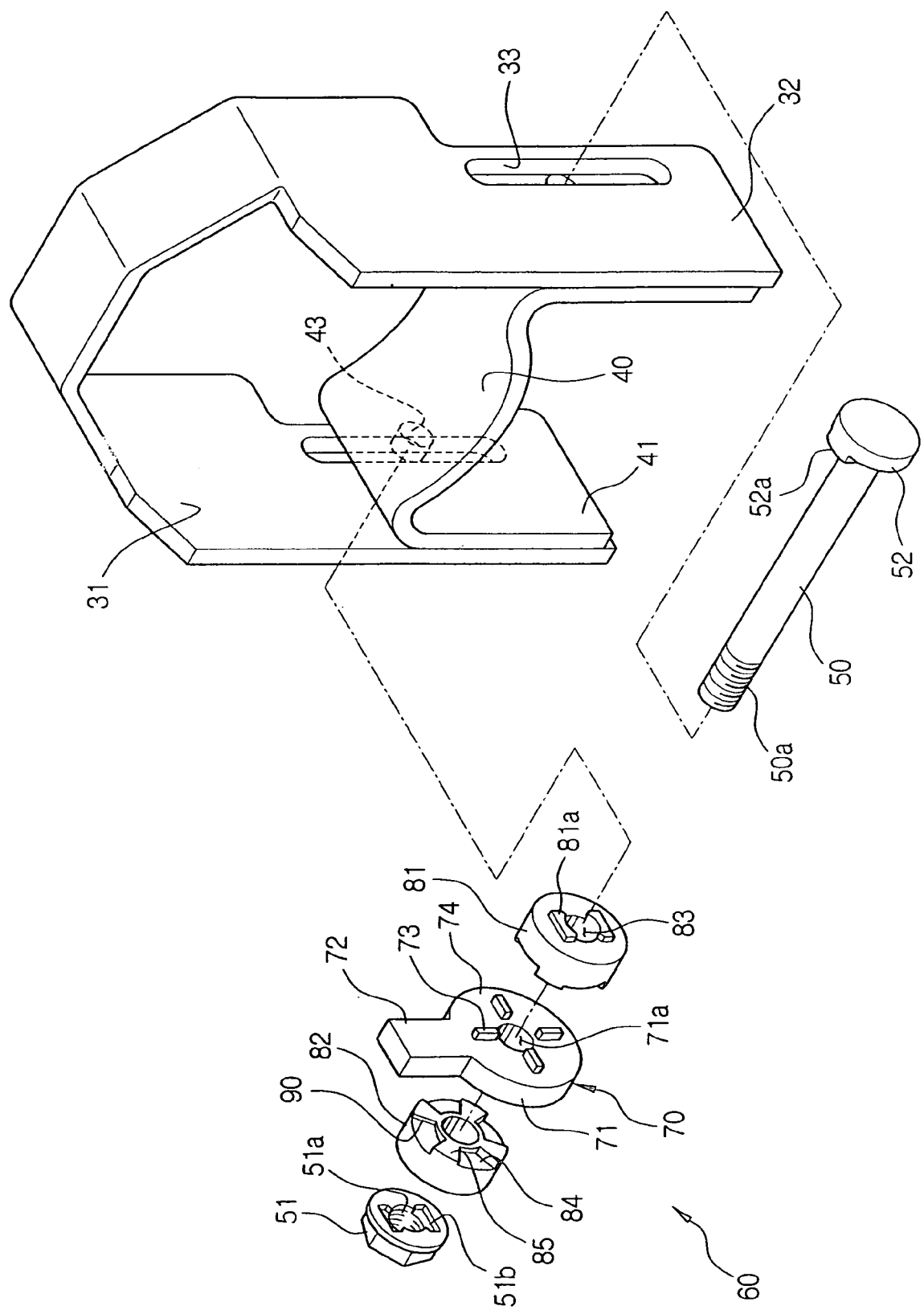
FIG. 3 is an exploded perspective view of the tilt adjusting unit for steering columns of FIG. 2.

A tilt adjusting unit for steering columns, according to the present invention, adjusts an angle of a steering column which tilts up and down, thus adjusting a height of a steering wheel which is provided at an upper end of the steering column. As shown in FIGS. 2 and 3, the tilt adjusting unit includes a mounting bracket 10, a steering column 20, and first and second support brackets 31 and 32. The mounting bracket 10 is mounted to a predetermined portion of a vehicle body. The steering column 20 is provided to tilt up and down relative to the vehicle body. The first and second support brackets 31 and 32 extend from the mounting bracket 10 to be placed on left and right sides of the steering column 20, respectively. In this case, the first support bracket 31 is provided to the left side of the steering column 20, and the second support bracket 32 is provided to the right side of the steering column 20.

Between the first and second support brackets 31 and 32 is provided a movable bracket 40 which is secured to the steering column 20 to tilt along with the steering column 20. A cover member 21 covers the steering column 20, and the movable bracket 40 is secured to the cover member 21 of the steering column 20 through, for example, a welding process.

First and second support parts 41 extend from left and right edges of the movable bracket 40 to be supported by inner surfaces of the first and second support brackets 31 and 32, respectively. Each of the first and second support parts 41 has a through hole 43 at a predetermined portion thereof, and a guide slot 33 is formed along a tilting direction of the steering column 20 through each of the first and second support brackets 31 and 32 at a position corresponding to the through hole 43. The first and second support brackets 31 and 32 and the movable bracket 40 are connected to each other by a connection rod 50 which passes through the through holes 43 of the first and second support parts 41 and the guide slots 33 of the first and second support brackets 31 and 32.

Thus, when the movable bracket 40 tilts up and down, the connection rod 50 moves up and down along the guide slots 33 while changing the angle of the steering column 20 which is secured to the movable bracket 40.

First and second stoppers 51 and 52 are respectively provided on opposite ends of the connection rod 50 to prevent the first and second support brackets 31 and 32 from being removed from an outside the connection rod 50, thus preventing the movable bracket 40 from being removed from the first and second support brackets 31 and 32. The first stopper 51 is provided to a left side of the connection rod 50, and is fastened to a first end of the connection rod 50 in a screw-type fastening method. The second stopper 52 is integrally provided on a second end of the connection rod 50. To fasten the first stopper 51 to the first end of the connection rod 50 in the screw-type fastening method, the first stopper 51 has an internal threaded part 51a, and the connection rod 50 has an external threaded part 50a on the first end thereof.

Further, a locking unit 60 is provided at a predetermined position between the first stopper 51 and the first support bracket 31 to lock or unlock the movable bracket 40 to or from the first and second support brackets 31 and 32, thus locking the steering column 20 at an adjusted angle or releasing the steering column 20 from a locked position.

The locking unit 60 includes a rotary unit 70 and inner and outer movable units 81 and 82. The rotary unit 70 is rotatably provided on a predetermined portion of the connection rod 50. The inner and outer movable units 81 and 82 are provided so that the inner and outer movable units 81 and 82 and the rotary unit 70 support each other, and the inner and outer movable units 81 and 82 move along the connection rod 50 as the rotary unit 70 rotates, thus locking or unlocking the movable bracket 40 to or from the first and second support brackets 31 and 32. A rotation restraining part 90 is provided on a predetermined portion of one of the rotary unit 70 and the inner and outer movable units 81 and 82 to prevent the rotary unit 70 from rotating when the movable bracket 40 is locked to the first and second support brackets 31 and 32.

In the locking unit 60 constructed as described above, as the rotary unit 70 rotates, the inner and outer movable units 81 and 82 move along the connection rod 50 to lock the movable bracket 40 to the first and second support brackets 31 and 32. Further, when the movable bracket 40 is locked to the first and second support brackets 31 and 32, the rotation restraining part 90 prevents the rotary unit 70 from rotating, thus allowing a user to easily confirm whether the steering column 20 is locked at a desired angle or not.

In a detailed description, the rotary unit 70 includes a body 71 and a lever 72. The body 71 has at a central portion thereof a locking hole 71a so that the connection rod 50 passes through the locking hole 71a. The lever 72 extends from the body 71 to a predetermined height. The inner and outer movable units 81 and 82 are provided on right and left sides of the rotary unit 70, respectively. In this case, the inner movable unit 81 is provided at a predetermined position inside the rotary unit 70, while the outer movable unit 82 is provided at a predetermined position outside the rotary unit 70. Further, the inner and outer movable units 81 and 82 are provided to be symmetrical with each other relative to the rotary unit 70. The inner and outer movable units 81 and 82 respectively have locking holes 83 so that the connection rod 50 passes through the locking holes 83.

A first cam face 85 is provided on each of facing surfaces of the inner and outer movable units 81 and 82 which face the rotary unit 70. The first cam face 85 has an inclined part 84 which is inclined along a circumferential direction of the first cam face 85. Further, a second cam face 74 is provided on each of opposite surfaces of the rotary unit 70 which face the inner and outer movable units 81 and 82. The second cam face 74 has a pressing part 73 to press or release the inclined part 84 of the first cam face 85 according to a rotating direction of the rotary unit 70.

When the rotary unit 70 rotates in a direction to cause an operation of the pressing parts 73 of the second cam faces 74 of the rotary unit 70, in conjunction with the inclined parts 84 of the first cam faces 85 of the inner and outer movable units 81 and 82, the inner and outer movable units 81 and 82 move away from the rotary unit 70 in opposing directions. Because a movement of the locking unit 60 is performed within the connection rod 50 by the first and second stoppers 51 and 52, the locking unit 60 moves toward the first support bracket 31 by moving distances of the first and second movable units 81 and 82, thus pressing the first support bracket 31. Thus, the movable bracket 40 is in close contact with the first and second support brackets 31 and 32 to be locked to the first and second support brackets 31 and 32. On the other hand, when the rotary unit 70 rotates in a reverse direction, the inclined parts 84 are released from the pressing parts 73, and simultaneously, the first support bracket 31 is released from the locking unit 60. Thereby, the movable bracket 40 is unlocked from the first and second support brackets 31 and 32.

Although the first cam faces 85 may be provided on the opposite surfaces of the rotary unit 70 and the second cam faces 74 may be provided on the facing surfaces of the inner and outer movable units 81 and 82 which face the rotary unit 70, the inner and outer movable units 81 and 82 may move away from the rotary unit 70 by a rotation of the rotary unit 70. Thus, the first cam faces 85 may be provided on the opposite surfaces of the rotary unit 70 and the second cam faces 74 may be provided on the facing surfaces of the inner and outer movable units 81 and 82 which face the rotary unit 70. Preferably, the inclined part 84 may comprise a plurality of inclined parts and the pressing part 73 may comprise a plurality of pressing parts corresponding to the plurality of inclined parts, so as to allow the inner and outer movable units 81 and 82 to more stably and smoothly move.

Further, when the locking unit 60 is operated, and a torque generated by the rotation of the rotary unit 70 is transmitted to the inner and outer movable units 81 and 82 or to the connection rod 50, the inner and outer movable units 81 and 82 and the connection rod 50 rotate and thereby the inner and outer movable units 81 and 82 may not move away from the rotary unit 70 in opposing directions. Thus, in order to make the inner and outer movable units 81 and 82 move away from the rotary unit 70, the connection rod 50 and the inner and outer movable units 81 and 82 are provided so that the connection rod 50 and the inner and outer movable units 81 and 82 are prevented from rotating.

To prevent the connection rod 50 and the inner and outer movable units 81 and 82 from rotating, a first rotation preventing projection 81a is provided on a surface of the inner movable unit 81 which is opposite to the first cam face 85, and the first rotation preventing projection 81a is supported by the first support bracket 31. A second rotation preventing projection 52a is provided on a predetermined portion of the second stopper 52 to be supported by the second support bracket 32. Further, a third rotation preventing projection 82a is provided on a surface of the outer movable unit 82 which is opposite to the first cam face 85, and the third rotation preventing projection 82a is supported by the first stopper 51. The first, second, and third rotation preventing projections 81a, 52a, and 82a prevent the inner and outer movable units 81 and 82 and the connection rod 50 from rotating. Thus, when the rotary unit 70 rotates, the inner and outer movable units 81 and 82 rectilinearly reciprocate along the connection rod 50, but do not rotate.

Preferably, the first and second rotation preventing projections 81a and 52a are fitted into the guide slots 33 of the first and second support brackets 31 and 32, respectively, so that the first and second rotation preventing projections 81a and 52a are supported by the first and second support brackets 31 and 32, respectively, without any mounting member. Further, the first stopper 51 has a seat groove 51b so that the third rotation preventing projection 82a is seated in the first stopper 51.

Further, the rotation restraining part 90 is provided to allow the user to easily confirm whether the steering column 20 is locked at the adjusted angle or not. The rotation restraining part 90 is provided at an edge of the inclined part 84 which is provided on the first cam face 85 to prevent the rotary unit 70 from rotating when the inner and outer movable units 81 and 82 move away from the rotary unit 70 to a maximum, thus allowing the user to easily confirm whether the steering column 20 is locked at the desired angle or not.

As such, the inclined part 84 has a shape of a depression which is depressed on the first cam face 85, and the pressing part 73 has a shape of a projection which is projected from the cam face 74. The rotation restraining part 90 is provided between the edge of the inclined part 84, which is adjacent to the second cam face 74, and the first cam face 85.

The operation and operation effect of the tilt adjusting unit for steering columns according to the first embodiment of the present invention will be described in the following.

First, the first and second support brackets 31 and 32 and the movable bracket 40 are fitted over the connection rod 50 to be connected to each other, prior to assembling the first stopper 51 with the connection rod 50. In such a state, the second rotation preventing projection 52a of the second stopper 52 is fitted into the guide slot 33 of the second support bracket 32. Next, the inner movable unit 81 is fitted over the first end of the connection rod 50 which extends to an outside of the first support bracket 31, and the first rotation preventing projection 81a of the inner movable unit 81 is fitted into the guide slot 33 of the first support bracket 31. Thereafter, the rotary unit 70 and the outer movable unit 82 are sequentially fitted over the connection rod 50. Subsequently, the first stopper 51 is fitted over the first end of the connection rod 50 at a position outside the outer movable unit 82 while the third rotation preventing projection 82a of the outer movable unit 82 is seated in the seat groove 51b of the first stopper 51. At this time, the pressing part 73 of the rotary unit 70 is placed to be in contact with a side surface of the inclined part 84 which is opposite to the rotation restraining part 90 so that the movable bracket 40 is released from the first and second support brackets 31 and 32.

Figure 4:
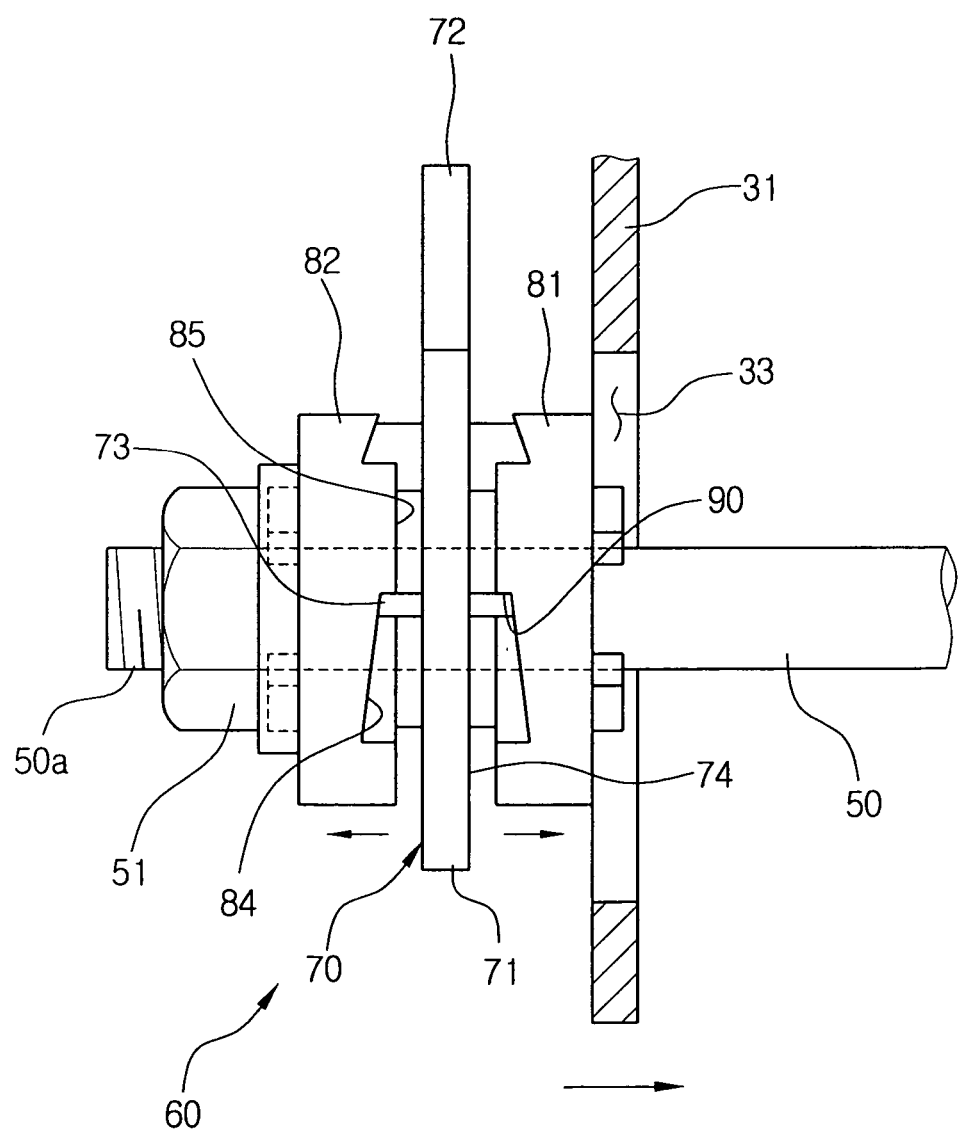
FIG. 4 is an enlarged front view of a locking unit included in the tilt adjusting unit of FIG. 2, with the steering column being locked.

After the angle of the steering column 20 is adjusted in such a state, the user rotates the rotary unit 70 in a direction using the lever 72. At this time, as shown in FIG. 4, each of the pressing parts 73 provided on the second cam face 74 moves along each of the inclined parts 84 of the first cam face 85 until being stopped by the rotation restraining part 90 which is provided at the edge of each of the inclined parts 84. Further, the inner and outer movable units 81 and 82 move away from the rotary unit 70 in opposing directions to the maximum. In this case, because the first stopper 51 is fixed not to move, the locking unit 60 which is provided between the first support bracket 31 and the first stopper 51, moves along the connection rod 50 toward the first support bracket 31 by a distance between the inner and outer movable units 81 and 82 which move away from the rotary unit 70 in opposing directions, and thereby press the first support bracket 31. Therefore, the first and second support brackets 31 and 32 come into close contact with the first and second support parts 41 of the movable bracket 40, respectively. The movable bracket 40 is locked to the first and second support brackets 31 and 32, and the steering column 40 which is secured to the movable bracket 40 is also locked. At this time, because each of the pressing parts 73 is stopped by the rotation restraining part 90 which is provided at the edge of each of the inclined parts 84, the rotary unit 70 does not any rotate more although the lever 72 is moved, thus allowing the user to reliably confirm whether the steering column 20 is locked or not.

Figure 5:
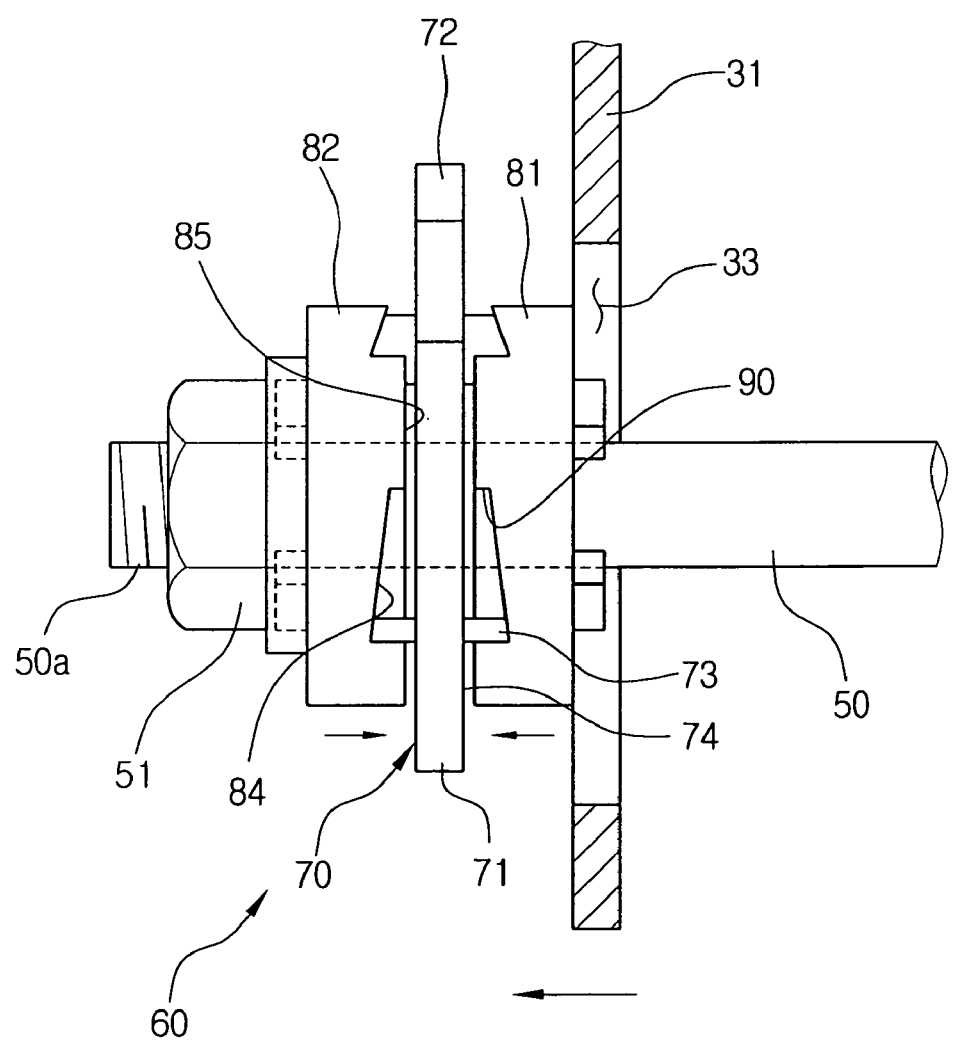
FIG. 5 is an enlarged front view of the locking unit included in the tilt adjusting unit of FIG. 2, with the steering column being unlocked.

Meanwhile, when the user desires to re-adjust the angle of the steering column 20 which is locked as described above, as shown in FIG. 5, the user rotates the rotary unit 70 using the lever 72 in a direction which is opposite to a rotating direction of the rotary unit 70 to lock the steering column 20.

At this time, each of the pressing parts 73 of the second cam face 74 moves along each of the inclined parts 84 of the first cam face 85 in a direction away from the rotation restraining part 90. In this case, the inner and outer movable units 81 and 82 return to original positions thereof, while the movable bracket 40 is unlocked from the first and second support brackets 31 and 32, so that the movable bracket 40 moves along the guide slots 33. In this way, the angle of the steering column 20 is adjusted again.

According to the first embodiment of the present invention, the tilt adjusting unit for steering columns is provided with two movable units. But, the steering column 20 may be locked using a locking unit 60' which has one movable unit. A tilt adjusting unit having one movable unit according to a second embodiment will be described in the following.

Since the general construction of the tilt adjusting unit according to the second embodiment remains the same as the tilt adjusting unit according to the first embodiment, except for a construction of the locking unit 60', those elements common to the first and second embodiments will not be described herein in detail.

Figure 6:
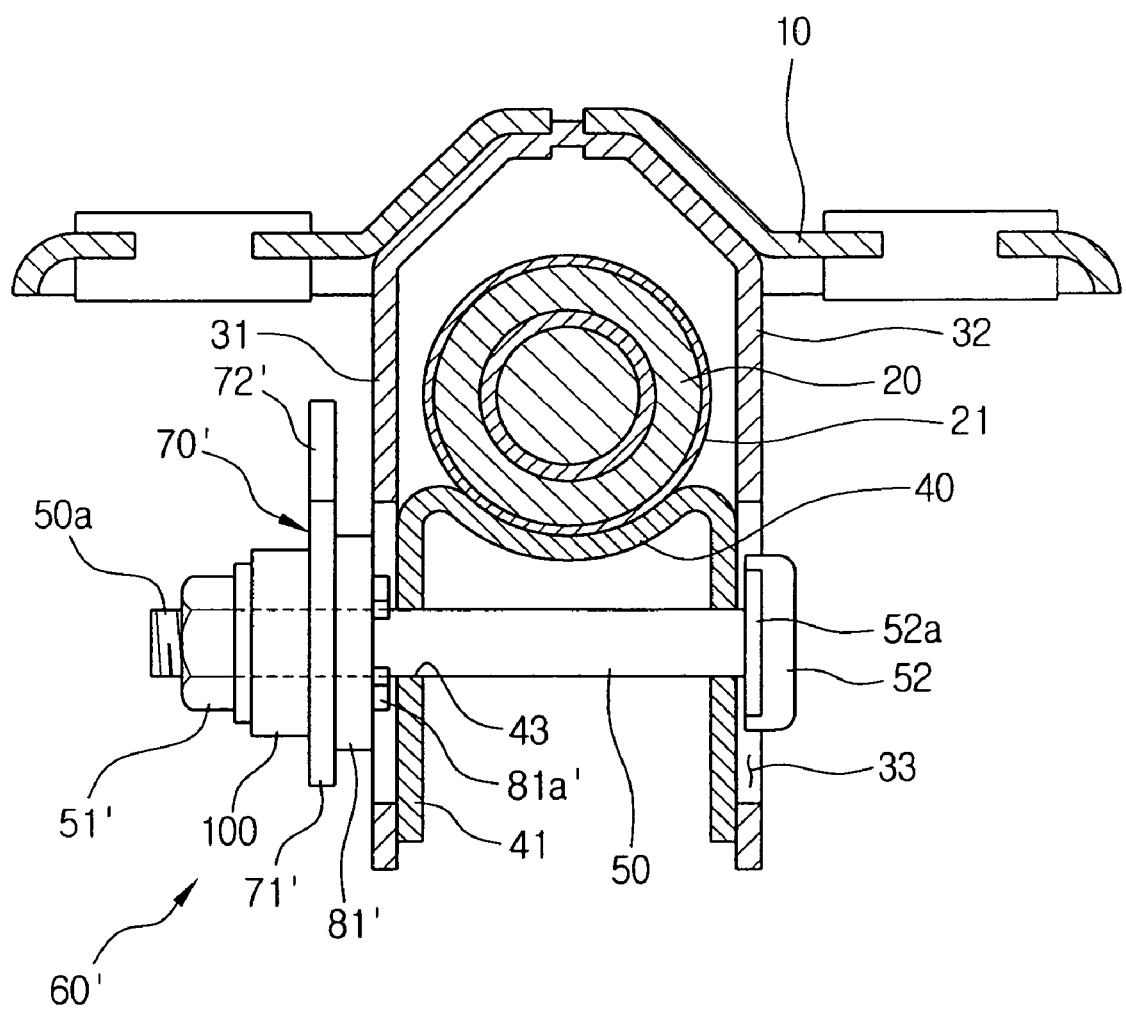
FIG. 6 is a sectional view of a tilt adjusting unit for steering columns, according to a second embodiment of the present invention.
Figure 7:
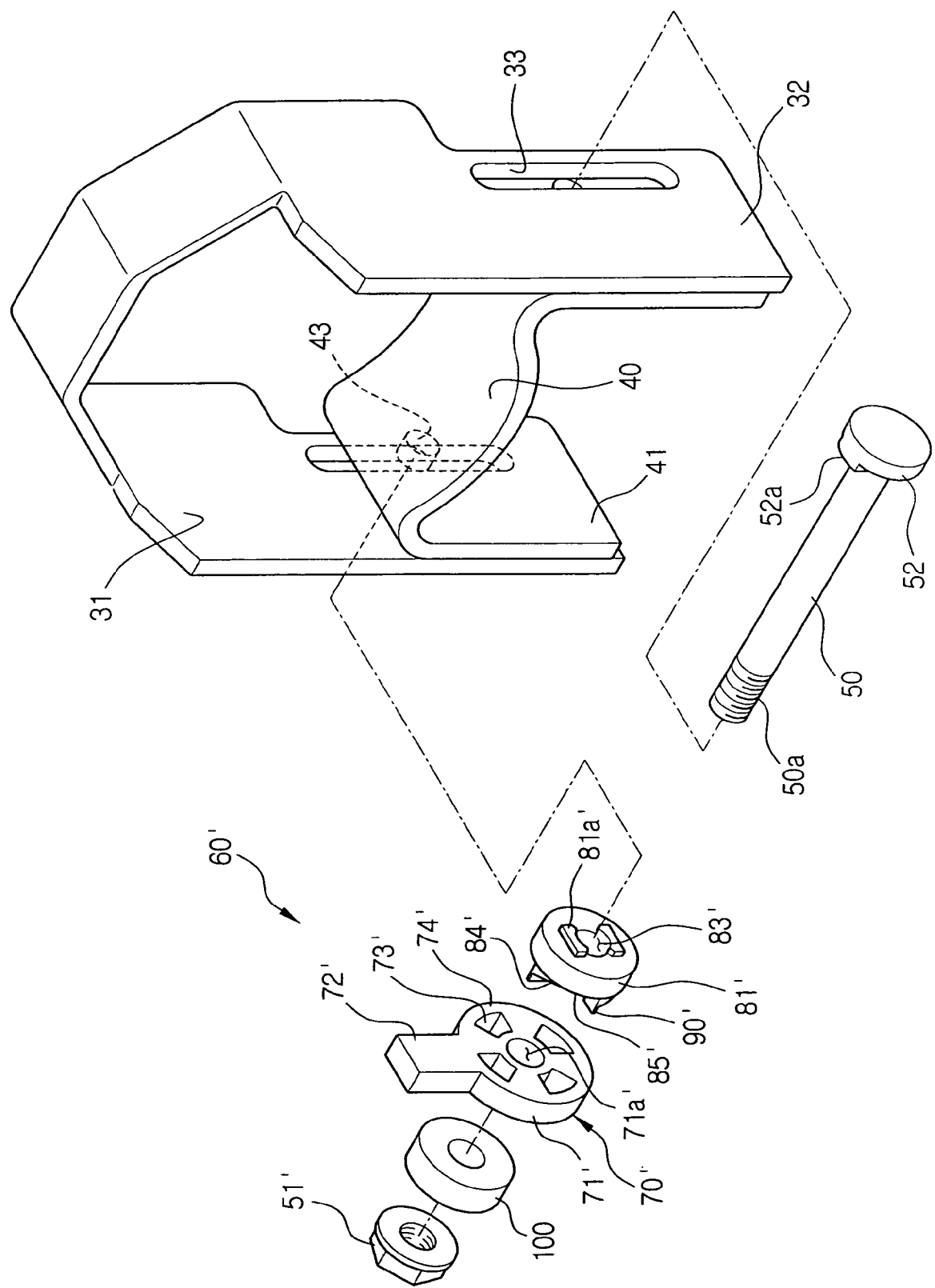
FIG. 7 is an exploded perspective view of the tilt adjusting unit for steering columns of FIG. 6.

As shown in FIGS. 6 and 7, in the tilt adjusting unit for steering columns according to the second embodiment, the locking unit 60' is provided at a predetermined position between a first stopper 51' and the first support bracket 31. The locking unit 60' includes a rotary unit 70' and one movable unit 81'. The movable unit 81' is provided between the rotary unit 70' and the first support bracket 31. A bearing 100 is provided between the first stopper 51' and the rotary unit 70' to ensure a smooth rotation of the rotary unit 70'.

The rotary unit 70' includes a body 71' which has at a central portion thereof a locking hole 71a' so that the connection rod 50 passes through the locking hole 71a'. A lever 72' extends from the body 71' to a predetermined height. Further, the movable unit 81' has a locking hole 83' at a central portion thereof so that the connection rod 50 passes through the locking hole 83'. First and second cam faces 85' and 74' are provided on facing surfaces of the movable unit 81' and the rotary unit 70', respectively. In this case, the first cam face 85' has an inclined part 84', and the second cam face 74' has a pressing part 73'. Alternatively, the first and second cam faces 85' and 74' may be respectively provided on the facing surfaces of the rotary unit 70' and the movable unit 81'. Further, the inclined part 84' comprises a plurality of inclined parts, and the pressing part 73' comprises a plurality of pressing parts corresponding to the plurality of inclined parts, thus allowing the movable unit 81' to stably move.

Similarly to the first embodiment, when the rotary unit 70' rotates in a direction, the inclined parts 84' are pressed by the pressing parts 73' and the movable unit 81' moves away from the rotary unit 70'. At this time, the locking unit 60' moves toward the first support bracket 31 by the first stopper 51' while pressing the first support bracket 31, thus locking the movable bracket 40 to the first and second support brackets 31 and 32. On the other hand, when the rotary unit 70' rotates in a reverse direction in such a state, the inclined parts 84' are released from the pressing parts 73' and the movable unit 81' returns to an original position thereof. Thereby, the movable bracket 40 is unlocked from the first and second support brackets 31 and 32.

Figure 8:
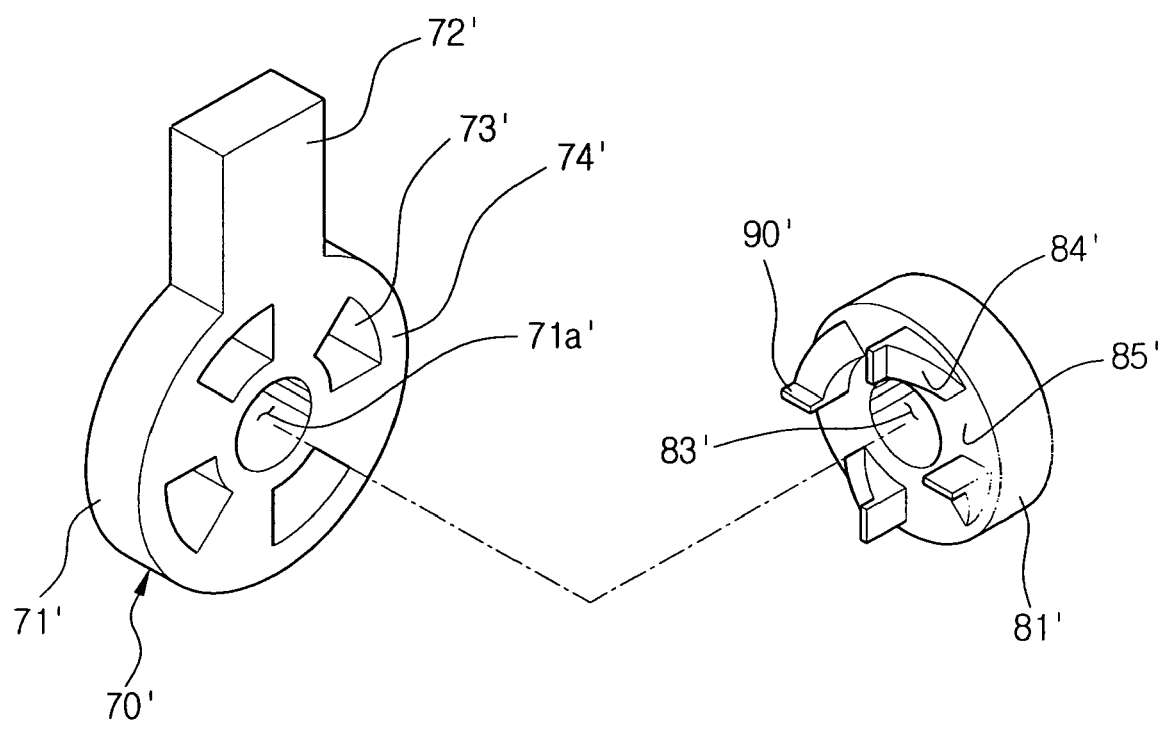
FIG. 8 is an enlarged perspective view of a rotary unit and a movable unit included in the tilt adjusting unit of FIG. 6.

Further, a rotation restraining part 90' is provided at an edge of each of the inclined parts 84' which are provided on the first cam face 85', thus preventing the rotary unit 70' from rotating when the steering column 20 is locked. According to the second embodiment of the present invention, as shown in FIG. 8, each of the inclined parts 84' has a shape of a projection which is projected from the first cam face 85', and each of the pressing parts 73' has a shape of a hole which is formed through the rotary unit 70' to receive the corresponding inclined part 84', thus pressing the inclined part 84' when the rotary unit 70' rotates. The rotation restraining part 90' extends from the edge of the inclined part 84', which is adjacent to the second cam face 74', into the pressing part 73'.

Thus, before the steering column 20 is locked, each of the inclined parts 84' is placed in the corresponding pressing part 73'. As the rotary unit 70' rotates in a direction, each of the inclined parts 84' moves to an outside of the corresponding pressing part 73', so that the movable unit 81' moves away from the rotary unit 70'. When the rotary unit 70' continuously rotates in such a state, an edge of each of the pressing parts 73' which has the shape of the hole is stopped by each of the rotation restraining parts 90' which extends into each of the pressing parts 73'. In this case, the movable unit 81' moves away from the rotary unit 70' to a maximum and thereby the movable bracket 40 is locked to the first and second support brackets 31 and 32. In such a state, because the edge of each of the pressing parts 73' is stopped by each of the rotation restraining part 90', the rotary unit 70' does not rotate any more, thus allowing the user to easily confirm whether the steering column 20 is locked at the desired angle or not.

Since each of the pressing parts 73' has only to receive the corresponding inclined parts 84', each of the pressing parts 73' may have a shape of a depression which is depressed on the second cam face 74', without being limited to the shape of the hole according to the second embodiment. Each of the pressing parts 73' having the shape of the depression provides the same operational effect of the pressing parts 73' having the shape of the hole. In the above state, when the rotation restraining part 90' may be constructed to extend into each of the pressing parts 73' having the shape of the depression. The rotation restraining part 90' functions to restrict a rotation of the rotary unit 70' when the steering column 20 has been locked.

In the tilt adjusting unit according to the second embodiment, the movable unit 81' and the connection rod 50 are prevented from rotating by a torque which is generated by a rotation of the rotary unit 70' when the locking unit 60' is operated, similarly to the tilt adjusting unit of the first embodiment. To prevent the movable unit 81' and the connection rod 50 from rotating, a first rotation preventing projection 81a' is provided on a surface of the movable unit 81' which is opposite to the first cam face 85', and the first rotation preventing projection 81a' is supported by the first support bracket 31. Further, a second rotation preventing projection 52a is provided on a predetermined portion of the second stopper 52 to be supported by the second support bracket 32. The first and second rotation preventing projections 81a' and 52a prevent the movable unit 81' and the connection rod 50 from rotating. Thus, the movable unit 81' only rectilinearly reciprocates along the connection rod 50.

The first and second rotation preventing projections 81a' and 52a are fitted into the guide slots 33 of the first and second support brackets 31 and 32, respectively, so that the first and second rotation preventing projections 81a' and 52a are supported by the first and second support brackets 31 and 32, respectively, without using any mounting member.

The operation and operational effect of the tilt adjusting unit for steering columns according to the second embodiment will be described in the following.

First, the first and second support brackets 31 and 32 and the movable bracket 40 are fitted over the connection rod 50 to be connected to each other, prior to assembling the first stopper 51' with the connection rod 50. In such a state, the second rotation preventing projection 52a of the second stopper 52 is fitted into the guide slot 33 of the second support bracket 32. Next, the movable unit 81' is fitted over the first end of the connection rod 50 which extends to an outside of the first support bracket 31, and the first rotation preventing projection 81a' of the movable unit 81' is fitted into the guide slot 33 of the first support bracket 31. Thereafter, the rotary unit 70' and the bearing 100 are sequentially fitted over the connection rod 50. Subsequently, the first stopper 51' is fitted over the first end of the connection rod 50 at a position outside the bearing 100. At this time, each of the inclined parts 84' of the movable unit 81' is placed in each of the pressing parts 73' of the rotary unit 70' having the shape of the hole so that the movable bracket 40 is unlocked from the first and second support brackets 31 and 32.

Figure 9:
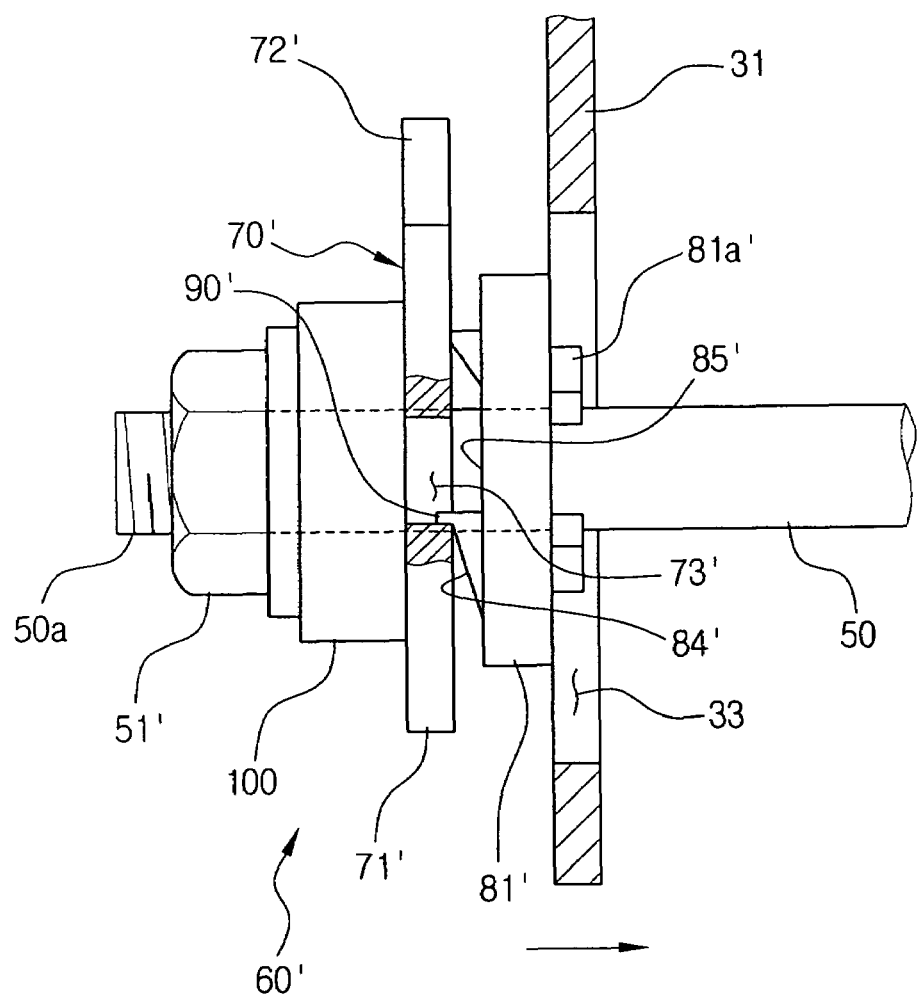
FIG. 9 is an enlarged front view of a locking unit included in the tilt adjusting unit of FIG. 6, with the steering column being locked.

After the angle of the steering column 20 is adjusted in such a state, the user rotates the rotary unit 70' in a direction using the lever 72'. At this time, as shown in FIG. 9, each of the inclined parts 84' provided on the first cam face 85' moves out of each of the pressing parts 73' provided on the second cam face 74', and an edge of each of the pressing parts 73' having the shape of the hole is stopped by the rotation restraining part 90' which is provided at an edge of each of the inclined parts 84'. At this time, the movable unit 81' moves away from the rotary unit 70' to a maximum. In this case, because the first stopper 51' is fixed not to move, the locking unit 60' which is provided between the first support bracket 31 and the first stopper 51', moves along the connection rod 50 toward the first support bracket 31 by a distance from the rotary unit 70' to the movable unit 81', and thereby press the first support bracket 31. Therefore, the first and second support brackets 31 and 32 come into close contact with the first and second support parts 41 of the movable bracket 40, respectively. The movable bracket 40 is locked to the first and second support brackets 31 and 32, and the steering column 40 which is secured to the movable bracket 40 is also locked. At this time, because each of the pressing parts 73' is stopped by the rotation restraining part 90' which is provided at the edge of each of the inclined parts 84', the rotary unit 70' does not any rotate more although the lever 72' is operated, thus allowing the user to reliably confirm whether the steering column 20 is locked or not.

Figure 10:
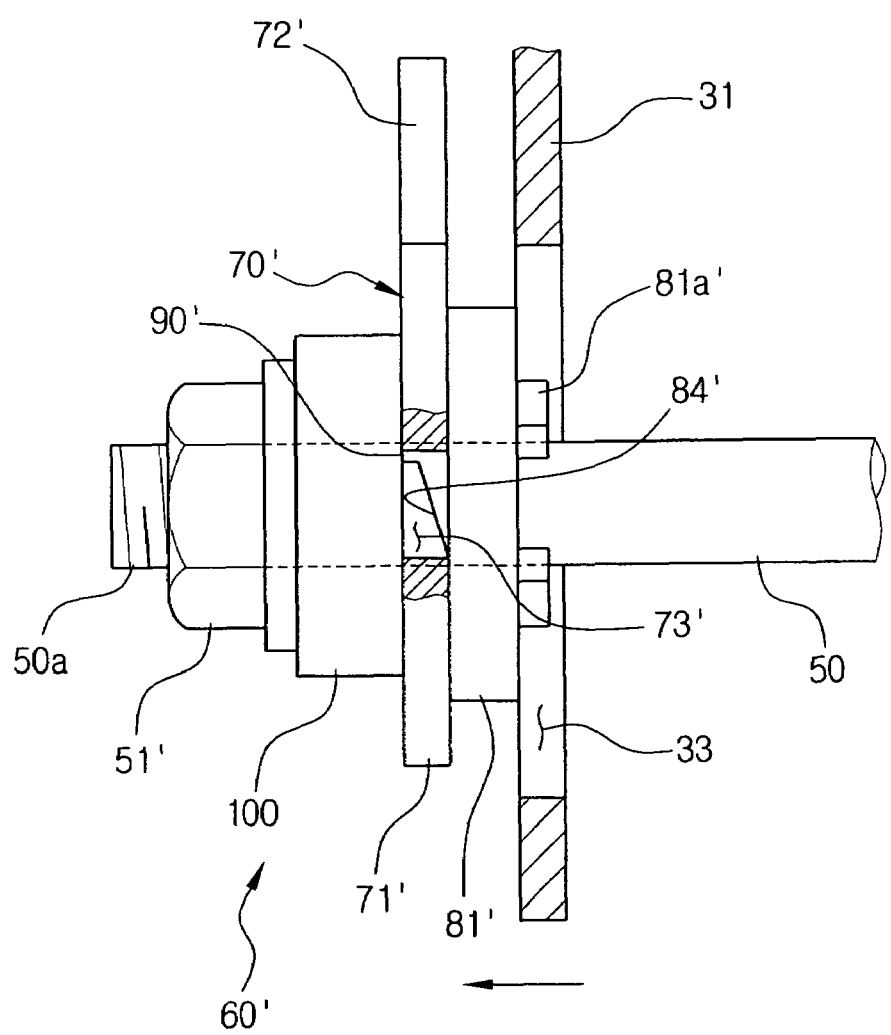
FIG. 10 is an enlarged front view of the locking unit included in the tilt adjusting unit of FIG. 6, with the steering column being unlocked.

Meanwhile, when the user desires to re-adjust the angle of the steering column 20 which is locked as described above, as shown in FIG. 10, the user rotates the rotary unit 70' using the lever 72', in a direction which is opposite to a rotating direction of the rotary unit 70' to lock the steering column 20. At this time, each of the inclined parts 84' of the first cam face 85' moves into each of the pressing parts 73' of the second cam face 74. In this case, the movable unit 81' returns to an original position thereof, while the movable bracket 40 is released from the first and second support brackets 31 and 32, so that the movable bracket 40 moves along the guide slots 33. In this way, the angle of the steering column 20 is adjusted again.

Further, the tilt adjusting unit according to the second embodiment is provided with the bearing 100, thus allowing the rotary unit 70' to more smoothly rotate when the locking unit 60' is operated. Because the tilt adjusting unit according to the second embodiment has one movable unit 81', a width of the locking unit 60' is reduced and thereby a volume of the tilt adjusting unit is reduced.

The operation of the locking unit 60, 60' of the tilt adjusting unit for steering columns according to the present invention is as follows. As the rotary unit 70, 70' rotates, the movable unit 81 and 82, 81' move along the connection rod 50 to lock the movable bracket 40 to the first and second support brackets 31 and 32. Further, when the movable bracket 40 is locked to the first and second support brackets 31 and 32, the rotation restraining part 90, 90' of the locking unit 60, 60' prevents the rotary unit 70, 70' from rotating, thus allowing the user to easily confirm whether the steering column 20 is locked at the adjusted angle or not.

In the first and second embodiments, the locking unit 60, 60' is provided between the first stopper 51, 51' and the first support bracket 31. However, when the movable unit 81 and 82, 81' and the connection rod 50 are provided to be prevented from rotating, the locking unit 60, 60' may be provided between the second stopper 52 and the second support bracket 32, or between the first and second support brackets 31 and 32 and the movable bracket 40, or between the first and second support parts 41 of the movable bracket 40. Thus, as the rotary unit 70, 70' rotates, the movable unit 81 and 82, 81' moves away from the rotary unit 70, 70' and thereby the movable bracket 40 is supported by the first and second support brackets 31 and 32.

As is apparent from the above description, the present invention provides a tilt adjusting unit for steering columns, which has a locking unit. In the locking unit of the present invention, as a rotary unit rotates, a movable unit moves along a connection rod to lock a movable bracket to support brackets. Further, when the movable bracket is locked to the support brackets, a rotation restraining part of the locking unit prevents the rotary unit from rotating, thus allowing a user to easily confirm whether a steering column is locked at a desired angle or not.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:
1. A tilt adjusting unit for steering columns, comprising:
a support bracket mounted to a predetermined portion of a vehicle body;
a steering column mounted to a predetermined portion of the vehicle body to tilt relative to the vehicle body;
a movable bracket to tilt along with the steering column;
a connection rod to connect the movable bracket to the support bracket;
a guide slot formed on a predetermined portion of the support bracket along a tilting direction of the steering column, with the connection rod passing through the guide slot;
a stopper provided at each of opposite ends of the connection rod to prevent the movable bracket from being removed from the support bracket;
a locking unit provided on a predetermined portion of the connection rod to lock or unlock the movable bracket to or from the support bracket, the locking unit comprising: a rotary unit rotatably provided on a predetermined portion of the connection rod; a movable unit provided on a predetermined portion of the connection rod so that the movable unit and the rotary unit support each other, the movable unit moving along the connection rod as the rotary unit rotates, thus locking or unlocking the movable bracket to or from the support bracket; and a rotation restraining part to prevent the rotary unit from further rotating in a locking direction when the movable bracket is locked to the support bracket;

wherein the support bracket comprises first and second support brackets which are provided on opposite sides of the steering column, respectively, with a first rotation preventing projection being provided at a predetermined portion of the inner movable unit to be supported by the first support bracket, and a second rotation preventing projection being provided at a predetermined portion of the stopper to be supported by the second support bracket, thus preventing the inner movable unit and the connection rod from rotating, the movable bracket is provided at a predetermined position between the first and second support brackets, the stopper comprises:

a first stopper which is provided at a predetermined position adjacent to the first support bracket, with a third rotation preventing projection being provided at a predetermined portion of the outer movable unit to be mounted to the first stopper, thus preventing the outer movable unit from rotating; and a second stopper which is provided at a predetermined position adjacent to the second support bracket, with the second rotation preventing projection being provided at a predetermined portion of the second stopper, and the locking unit is provided at a predetermined position between the first stopper and the first support bracket.

2. The tilt adjusting unit according to claim 1, further comprising: a first cam face provided on one of facing surfaces of the rotary unit and the movable unit which face each other, the first cam face having an inclined part which is inclined along a circumferential direction of the first cam face; and a second cam face provided on a remaining one of the facing surfaces of the rotary unit and the movable unit which face each other, the second cam face having a pressing part to press or release the inclined part according to a rotating direction of the rotary unit.

3. The tilt adjusting unit according to claim 2, wherein the rotation restraining part is provided at an edge of the inclined part to stop the pressing part.

4. The tilt adjusting unit according to claim 3, wherein the inclined part has a shape of a depression which is depressed on the first cam face, the pressing part has a shape of a projection which is projected from the second cam face, and the rotation restraining part is provided between the edge of the inclined part, which is adjacent to the second cam face, and the first cam face.

5. The tilt adjusting unit according to claim 1, further comprising a lever provided on a predetermined portion of the rotary unit.

6. The tilt adjusting unit according to claim 2, wherein the inclined part comprises a plurality of inclined parts, and the pressing part comprises a plurality of pressing parts corresponding to the plurality of inclined parts.

7. The tilt adjusting unit according to claim 2, wherein the movable unit and the connection rod are provided so that the movable unit and the connection rod are prevented from rotating.

8. The tilt adjusting unit according to claim 2, wherein the movable unit comprises a pair of movable units provided on opposite sides of the rotary unit, the pair of movable units comprising: an inner movable unit provided at a predetermined position inside the rotary unit; and an outer movable unit provided at a predetermined position outside the rotary unit.

9. The tilt adjusting unit according to claim 1, wherein the first and second rotation preventing projections are respectively fitted into the guide slots of the first and second support brackets, and the first stopper has at a predetermined portion thereof a seat groove so that the third rotation preventing projection is seated in the seat groove.

10. A tilt adjusting unit for steering columns, comprising:

a support bracket mounted to a predetermined portion of a vehicle body;

a steering column mounted to a predetermined portion of the vehicle body to tilt relative to the vehicle body;

a movable bracket to tilt alone with the steering column;

a connection rod to connect the movable bracket to the support bracket;

a guide slot formed on a predetermined portion of the support bracket along a tilting direction of the steering column, with the connection rod passing through the guide slot;

a stopper provided at each of opposite ends of the connection rod to prevent the movable bracket from being removed from the support bracket;

a locking unit provided on a predetermined portion of the connection rod to lock or unlock the movable bracket to or from the support bracket, the locking unit comprising: a rotary unit rotatably provided on a predetermined portion of the connection rod; a movable unit provided between the rotary unit and the support bracket on a predetermined portion of the connection rod, the movable unit moving along the connection rod as the rotary unit rotates, thus locking or unlocking the movable bracket to or from the support bracket; and a rotation restraining part to prevent the rotary unit from further rotating in a locking direction when the movable bracket is locked to the support bracket;

wherein the support bracket comprises first and second support brackets which are provided on opposite sides of the steering column, respectively, with a first rotation preventing projection being provided at a predetermined portion of the inner movable unit to be supported by the first support bracket, and a second rotation preventing projection being provided at a predetermined portion of the stopper to be supported by the second support bracket, thus preventing the movable unit and the connection rod from rotating, the movable bracket is provided at a predetermined position between the first and second support brackets, the stopper comprises:

a first stopper which is provided at a predetermined position adjacent to the first support bracket; and a second stopper which is provided at a predetermined position adjacent to the second support bracket, with the second rotation preventing projection being provided at a predetermined portion of the second stopper, and the locking unit is provided at a predetermined position between the first stopper and the first support bracket.

11. The tilt adjusting unit according to claim 10, further comprising a bearing provided at a predetermined position between the rotary unit and the first stopper.

12. The tilt adjusting unit according to claim 10, further comprising a lever provided on a predetermined portion of the rotary unit.

13. The tilt adjusting unit according to claim 10, wherein the first and second rotation preventing projections are respectively fitted into the guide slots of the first and second support brackets.

* * * * *